Figure 1:
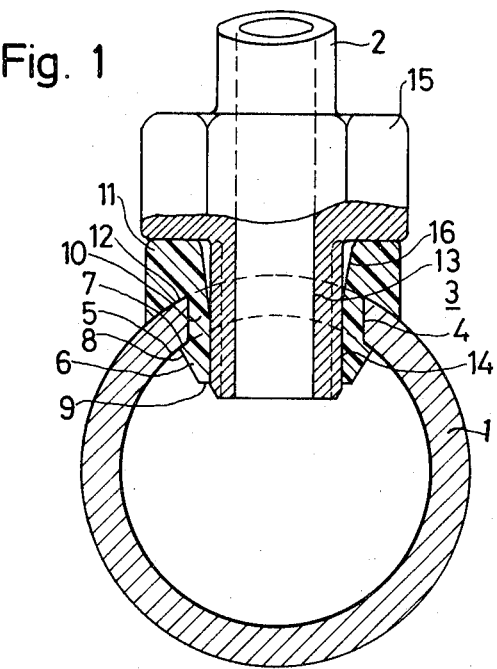

United States Patent [19]
Andersson

[11] 3,863,960
[45] Feb. 4, 1975

[54] DEVICE FOR TUBE FITTINGS

[76] Inventor: Rune Sigvard Andersson, Berchshill, Ossjo 43, S-262 00 Angelholm, Sweden

[22] Filed: Nov. 26, 1973

[21] Appl. No.: 419,118

[30] Foreign Application Priority Data
Dec. 1, 1972  Sweden.............................. 15664/72
Apr. 30, 1973  Sweden.............................. 7306053

[52] U.S. Cl...................... 285/39, 285/40, 285/162, 285/220
[51] Int. Cl............................................. F16l 35/00
[58] Field of Search ............ 285/220, 40, 194, 162, 285/196, 39; 16/2

[56] References Cited
UNITED STATES PATENTS
2,802,503  8/1957  Zupa................. 285/220 X
3,243,206  3/1966  Somer................ 285/162
3,677,578  7/1972  Roos.................. 285/162

FOREIGN PATENTS OR APPLICATIONS
1,227,975  4/1971  Great Britain...................... 285/162
1,139,435  1/1969  Great Britain...................... 285/162

Primary Examiner—Dave W. Arola
Attorney, Agent, or Firm—John J. Dennemeyer

[57] ABSTRACT

A tube connection comprising a fitting having a threaded end portion extending through a hole into a tube and an elastic sleeve disposed in said hole around said threaded end portion, said sleeve having an inner collar engaging the inner surface of the tube and an outer collar engaging the outer surface of the tube, and the fitting having a flange portion which presses against the outer collar to maintain both collars in sealing contact with said tube.

6 Claims, 4 Drawing Figures

3,863,960

DEVICE FOR TUBE FITTINGS

The present invention relates to a device for tube fittings wherein a tube shaped end portion of a branch pipe, a valve or the like, and especially a drinking-water valve for cattle, projects into a hole in the wall of a tube line and is attached to the same through a connecting part.

To connect a branch pipe to a tube line it is previously known to cut threads in the hole wall of the tube line to insert the end portion of the branch pipe by screwing, and seal with threading tape, tow or tube cement or a similar sealing agent. The branch pipe does not obtain the required attachment to the tube line, however, because the tube line often has a relatively small thickness and, as a result, only a few threads may be cut into the same. This means that the branch pipe easily gets loose with a resulting risk of leakage.

For this reason, a connecting part is often attached to the tube line, whereby a better securing of the branch pipe is obtained. In connecting parts of a known design, however, it is necessary to apply a sealing agent to seal threading and joints.

The object of the present invention is to permit a reliable securing of the branch pipe to the tube line and at the same time obtain the required sealing action without the use of thread tape, tow and tube cement or other sealing agents. To accomplish this object the invention is substantially characterized in that the end portion has a threading and the connecting part comprises an elastic sleeve, which expands in the radial direction to a sealing contact with the hole wall by screwing of the end portion into the same, and whereby the sleeve has an inner collar shaped to engage the inner side of the tube line and an outer collar to engage the outer side thereof around the hole, and that the end portion has an outer part that presses against the outer collar and keeps the same in sealing contact with the outer side of the tube line at the same time that the inner collar is pressed in the opposite direction and sealingly engages the inner side of the tube line.

In tube lines containing high pressure flowing media, it is necessary that the connecting part also obtains a very good sealing against the outer side of the tube line, and furthermore, it is essential to mount the end portion with a secure grip on the tube line in case the same is included in a drinking-water valve for cattle, since the same is often subjected to great stresses. To accomplish this object, the invention is characterized in that the end portion turns freely in the sleeve along an end section of the same radially inside of the outer collar, which permits this to be accurately shaped in correspondence to the outer side of the tube line when the same is subjected to pressure from the outer portion.

Figure 2:
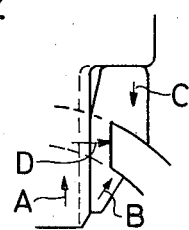
Figure 3:
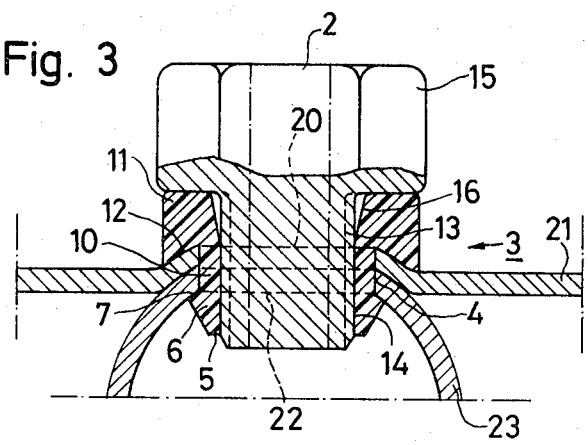
Figure 4:
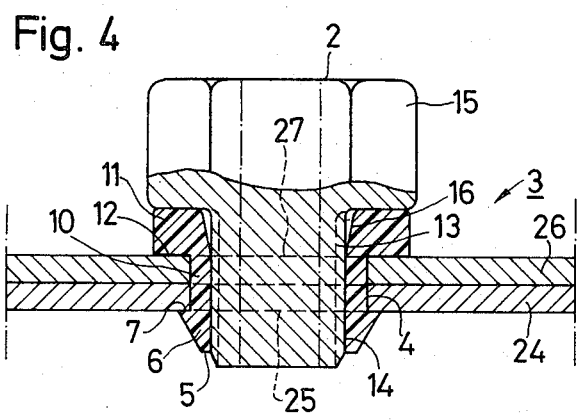

A device for tube fittings according to the invention is further described in the following with reference to an accompanying drawing in which:

FIG. 1 is a sectional view of the device in the connected condition,

FIG. 2 schematically illustrates the forces acting upon the fitting in the securing thereof, FIG. 3 is a sectional view of an alternate embodiment and use of the device according to the invention, and FIG. 4 is a sectional side view illustrating a further alternative use of the device according to the invention.

FIG. 1 illustrates a tube line 1 in a sectional view to which a branch pipe 2 is to be connected. This is accomplished by means of a sleeve with the general reference numeral 3 that, according to the invention, is made from an elastic material, preferable a plastic material having resilient characteristics. The sleeve 3 projects into the tube line 1 through a hole 4 in the wall thereof. To obtain a sealing action against the inner side 5 of the tube line wall around the hole 4, the sleeve 3 has an inner collar 6, whereby one side 7 thereof is directed to contact the inner side 5 of the tube wall. Further, the collar 6 has an outer side 8 which extends perpendicular to the side 7 from the end edge 9 of the sleeve 3, whereby the collar 6 conically tapers towards this end edge. As a result of this tapering, the collar 6 is more easily inserted through the hole 4 by insertion of the sleeve into the tube line 1 and, in addition, a force is exerted by the sleeve 3 in a direction perpendicular to the inner side 5 by the contact surface of the collar (arrow B in FIG. 2).

The sleeve 3 has a waist portion 10 dimensioned to engage the wall of the hole 4 and in addition has an outer collar 11, the inside 12 of which is designed to contact the outer side of the tube line 1 around the hole 4. This collar 11 has a relatively large diameter so that a substantial part of the outer side of the tube line around the hole 4 may be covered.

To secure the branch pipe in the sleeve 3 with a firm grip, the branch pipe 2 is formed with a threaded end portion 13 and the bore 14 of the sleeve 3 is so dimensioned that the threading of the end portion 13 cuts threads into the same by the screwing of the end portion. In addition, the bore 14 is so dimensioned that the waist portion 7 of the sleeve is pressed radially outward with a relatively great pressure to sealingly engage the wall of the hole 4 by the screwing step.

To bring the collars 6, 11 of the sleeve to sealingly contact the inner and outer sides of the tube line 1 and at the same time keep the sleeve with a firm grip on the tube line, the branch pipe 2 has a fixed outer portion 15 of hexagonal shape to define a nut-like flange. As mentioned above, the sleeve will expand by the screwing of the end portion 13, so that the waist portion thereof is pressed against the wall of the hole 4 (arrow D in FIG. 2). When the outer portion contacts the outer collar 11, the sleeve 3 is first acted upon in an outward direction (arrow A in FIG. 2), whereby the inner collar 6 is pressed to sealingly engage the inner side of the tube line 1. When this contact of the inner collar 9 has occurred and the screwing is continued, the outer collar 11 is pressed in an inward direction (arrow C in FIG. 2) to sealingly contact the outer side of the tube line 1 of the outer portion 15. This means that the sleeve 3 obtains sealing action towards the inner side of the tube line 1, the wall of the hole 4 and the outer side of the tube line 1, and furthermore, a much firmer grip on the tube line 1.

Since the outer collar 11 has a great diameter and the outer side of the tube line 1 is often uneven or rough, it may in many cases be difficult to bring the hole inside of the collar in sealing contact with the tube line 1, which is a disadvantage, especially if the tube line system is intended for high pressure flowing media. Yet the contact may be improved by making the sleeve from an especially yieldable material; there is a risk, however, that such a sleeve does not give the required firm grip for the branch pipe 2. To accomplish this object, the end portion 13 turns freely in the bore along a section radially inward of the outer collar 11 and along the least width of the outer collar or somewhat longer, which means that this part of the sleeve is no longer acted upon by forces in the outward direction (arrow A in FIG. 2) but totally in the inward direction (arrow C in FIG. 2), whereby the outer collar 11 may be subjected to a greater pressure than otherwise and may be shaped in correspondence to the outer side of the tube line 1 for the required sealing and securing. Free turning of the end portion 13 is obtained in the represented embodiment by giving an outer section 16 of the bore 14 of the sleeve an inwardly tapering conical form so that the threads of the end portion 13 do not obtain a grip in this part of the sleeve. However, an action is also obtained in case the end portion 13 lacks threading on a section adjacent the outer portion 15.

As an alternative to the fixed flange of the branch pipe 2 a screwable nut or the like (not shown) may be used, and the mentioned fitting is preferably suited for attachment of a drinking-water valve for cattle by the sealing characteristic and the firm grip thereof.

In this case, the end portion 13 projects from the valve housing (not shown) and the end edge of this or portions thereof replaces the fixed portion 15 or the nut. The valve housing or parts thereof may be fixedly or screwably mounted on the end portion 13, which means that the sleeve 3 may be attached in the same manner as the fixed portion or the nut. Drinking-water valves of the mentioned type are previously known and therefore are not given any further description, but it is essential to design the valve housing with an outer diameter as great as or even greater than that of the outer collar 11. This means, namely, that the collar 11 cannot be subjected to damages, which otherwise is often the case with projecting parts, especially in plants for breeding of pigs.

The tube fitting exemplified above is described and shown in FIGS. 1 and 2 and is utilized by tube lines having totally circular sections, that is, having arc shaped contact surfaces for the sleeve 3. To a great extent, however, the sleeve 3 permits satisfactory attachment and sealing action by securing to flat portions or to a flat side of a tube line (not shown), in this case, the sides 7, 12 of the sleeve 3 would define planar contact surfaces.

The sleeve 3 (also called adapter) may alternately be used to secure a branch pipe and at the same time fixedly hold an element to be brought into contact with the outer side of the tube line (FIG. 3).

For this purpose the sleeve 3 is designed in such a manner that the contact surfaces 7, 12 of the collars are positioned at a relatively large distance from each other, that is, a distance that approximately corresponds to the sum of the thicknesses of an element 21, preferably a bracket of some kind, and of the wall of a tube line 23. This means that the sleeve 3 may be pushed into a hole 20 in the element 21 and additionally through a hole 22 in the tube line 23, so that the contact surface 12 of the outer collar 11 engages the outer side of the element 21, and the contact surface 7 of the inner collar 6 engages the inner side of the tube line 23. By screwing of the pipe branch 2 into the bore 14 of the sleeve, the waist portion 10 of the sleeve will be brought into sealing contact with the sides of the holes 20, 22 and the contact surfaces 7, 12 of the collars will be brought into sealing contact with the sides of the bracket and the tube line 21, 23. At the same time, the bracket 21 will be secured to the tube line 23 with a firm grip.

Furthermore, the distance between the contact surfaces 7, 12 of the collars 6, 11 will correspond to the sum of the thicknesses of two elements of a suitable type, preferably such elements which are mounted adjacently to the tube line (for example a container wall and a bracket) so that these elements may be connected by means of sleeves 3 and branch pipes. The sleeve may also be designed so that the distance between the contact surfaces 7, 12 of the collars 6, 11 equals the sum of the thicknesses of two or more elements so that all these may be connected together at the same time.

According to the invention the branch pipe 2 may be shaped without a flow passage or this may be clogged so that the branch pipe and the sleeve together from a plug, closing the holes 20, 22 and at the same time defining a means to attach the element 21.

According to an alternate embodiment the collars 6, 11 of the sleeve 3 according to the invention have contact surfaces that are mainly perpendicular to the bore 14 of the sleeve, so that the same may be brought into sealing contact with a tube line 24 having flat sides or a flat portion around the hole 25, and contact a flat bracket 26 or a bracket having a flat part around the hole 27. Furthermore, the sleeve 3 may be utilized to connect flat elements of different kinds or elements of different kinds having flat portions around the hole. Also in this embodiment of the sleeve 3, a branch pipe 2 shaped as a plug may be used.

Preferably, the sleeve 3 is made from a plastic material that permits cold-welding by the screwing of the end portion 13, which means that a very reliable and well-sealing fitting is obtained between the sleeve and the end portion 13.

What is claimed is:

1. The combination of a fitting and sealing element for fitting a branch pipe to an opening in a structure, comprising:

a structure having inner and outer surfaces with an opening passing therethrough;

a generally tubular sealing element of resilient material having axially spaced circumferential shoulder rings;

a generally cylindrical fitting having an externally threaded portion of an outer diameter greater than the internal diameter of said tubular sealing element and an external annular shoulder adjacent one end of said threaded portion;

said sealing element extending through said opening with its circumferential shoulder rings respectively abutting the inner and outer surfaces of said structure around said opening, said fitting being threaded through said sealing element with its annular shoulder abutting one of said circumferential shoulder rings; and that portion of said fitting and sealing elements, radially inwardly of said one shoulder ring, being radially spaced and free of threaded engagement with each other whereby further rotation of said fitting axially compresses said sealing member and urges said shoulder rings axially toward each other into firm sealing engagement with said inner and outer surfaces of said structure.

2. The combination defined in claim 1 wherein said radially spaced portions are of an axial extent at least equal to the axial dimension of said one shoulder ring.

3. The combination defined in claim 2 wherein said radially spaced portion of said sealing element is of an inner diameter greater than the outer diameter of externally threaded portions of said fitting.

4. The combination defined in claim 3 wherein said radially spaced portion of said sealing element is conically tapered inwardly in a direction away from said annular shoulder.

5. The combination defined in claim 1 wherein said structure is a generally cylindrical conduit, the shoulder ring of said sealing element which engages the inner surface of said conduit having a generally conical peripheral surface substantially perpendicular to the inner surface of said conduit when viewed in transverse section.

6. The combination defined in claim 1 wherein the periphery of said annular shoulder is of non-circular outline adapted to be engaged by a wrenching tool.

* * * * *